(No Model.)
R. W. PAIN.
ORGAN.
No. 417,581. Patented Dec. 17, 1889.
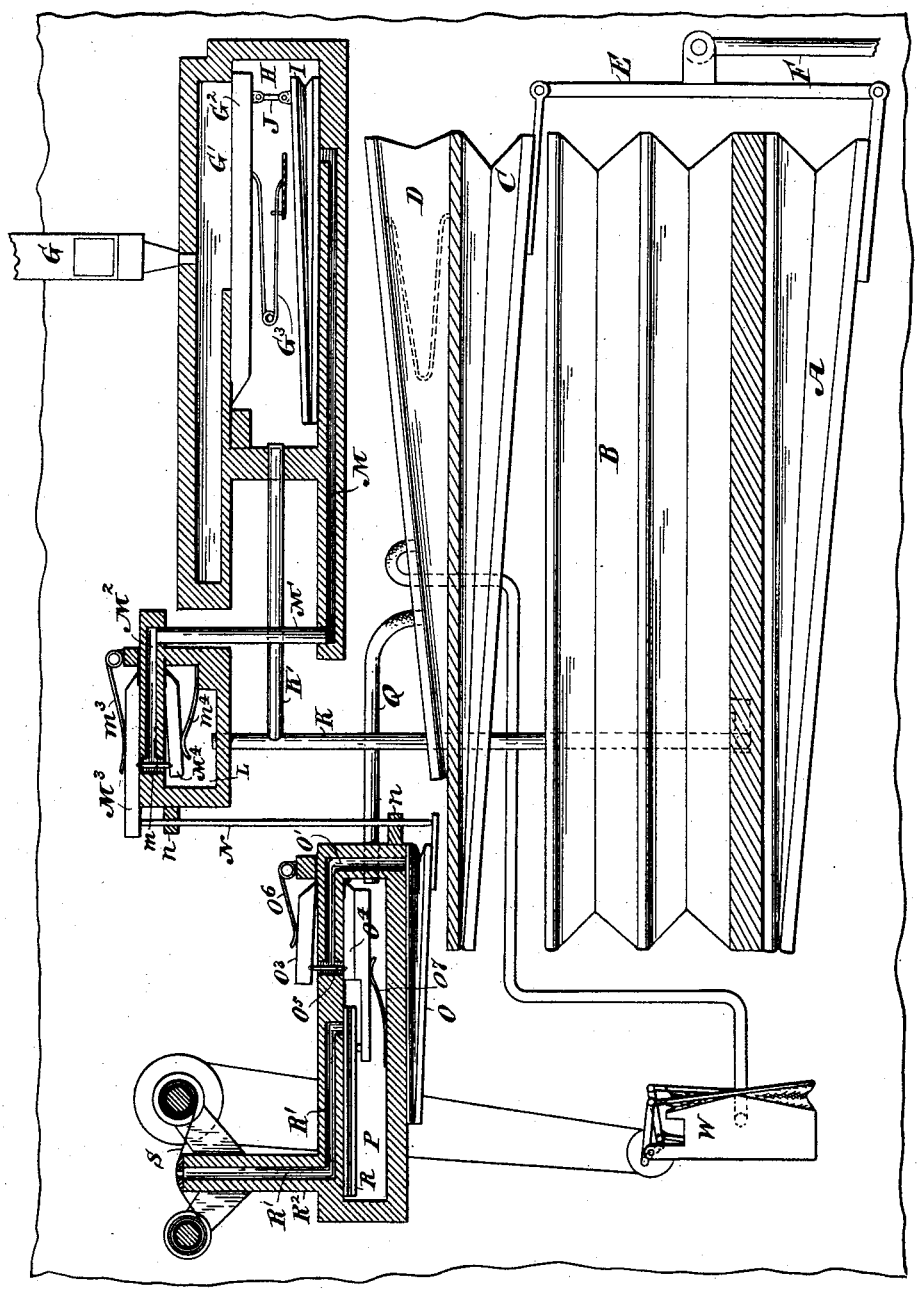
Witnesses
Wm. H. Robinson.
C. R. Ferguson
Inventor
Robert W. Pain
By his attorneys
Gifford & Brown

UNITED STATES PATENT OFFICE.

ROBERT W. PAIN, OF NEW YORK, N. Y., ASSIGNOR TO THE AEOLIAN ORGAN AND MUSIC COMPANY, OF SAME PLACE.

ORGAN.

SPECIFICATION forming part of Letters Patent No. 417,581, dated December 17, 1889.

Application filed January 23, 1889. Serial No. 297,231. (No model.)

*To all whom it may concern:*

Be it known that I, ROBERT W. PAIN, of New York, in the county and State of New York, have invented a certain new and useful Improvement in Organs, of which the following is a specification.

I will describe an organ embodying my improvement in detail, and then point out the novel features in claims.

The accompanying drawing is a vertical section of the parts of an organ embodying my improvement.

A designates one of a number of force-bellows.

B designates a receiver, into which air is forced by said bellows A.

C designates one of a number of exhaust-bellows.

D designates an equalizer, which communicates with the bellows C.

The bellows A C are shown as connected by a link E. This link is connected by a rod with a pedal or with any other source of power employed to operate the bellows.

G designates one of a number of pipes. It is shown as communicating at the lower end with a chamber G'. There will be for each pipe a separate chamber like the chamber G'. Each chamber G' is controlled by a valve $G^2$, which is arranged on the under side of said chamber and in a wind-chest H. The valves $G^2$ for a number of pipes may be arranged in the wind-chest H. Each valve $G^2$ is normally pressed upwardly to its seat by a spring $G^3$. With each valve $G^2$ is combined a pneumatic motor I. I have shown the pneumatic motor I as made in the form of a small bellows and as having the movable board connected by a link J with the corresponding valve $G^2$. The motor I is arranged in the wind-chest H. A number of them may be arranged in the same wind-chest.

It will be readily understood that when a motor I is collapsed it will pull down the corresponding valve $G^2$, and thereby allow air to flow from the wind-chest H into the chamber G' controlled by such valve, and thus into the pipe G communicating therewith.

Air is supplied to the wind-chest H by the bellows A through a pipe K and branch pipe K'. The pipe K also supplies air to another wind-chest L.

Each pneumatic motor I communicates independently of the others with the wind-chest L or with the atmosphere, according to the position of a pair of valves which are employed in connection with it. As here shown, the bottom of the wind-chest H is provided with a series of ducts M, one communicating with each pneumatic motor I. Each duct M communicates through a pipe or conduit M' with a duct $M^2$, here shown as located in the top of the wind-chest L and extending horizontally thereon. Each duct $M^2$ terminates in a vertical extension communicating at one end with the atmosphere and at the other end with the interior of the wind-chest L. Combined with the vertical extension of each duct $M^2$ is a pair of valves $M^3$ $M^4$. The valve $M^3$ of each pair is on the outer side of the wind-chest L and controls the communication of the corresponding duct $M^2$ with the atmosphere. The valve $M^4$ of each pair is arranged inside the chamber L and controls the communication of the corresponding duct $M^2$ with the interior of the chamber. Between the valves $M^3$ $M^4$ of each pair is a pin $m$, extending through the vertical extension of the corresponding duct $M^2$ and made of such length that when one of the valves of each pair moves to its seat the other valve of each pair will be forced to move away from its seat. Springs $m^3$ $m^4$ are combined with each pair of valves $M^3$ $M^4$ to force them to their seats when this becomes possible. The valves, their springs, and the appurtenant parts are so organized that normally the valves $M^3$ will be closed and the valves $M^4$ open; hence communication will normally exist between the air-chamber L and the interior of the pneumatic motors I. Owing to this, the valves $G^2$ will be normally held to their seats to prevent the passage of air to the pipes G.

The opening or raising of a valve $M^3$ will permit the opposite valve $M^4$ to rise to its seat. In this way communication between the air-chamber and the duct and tube corresponding to the pair of valves thus operated will be cut off, and said duct will be put in communication with the atmosphere. When this occurs, the compressed air within the corresponding pneumatic motor I will be allowed to escape through the duct M, pipe M', and duct M². Then the motor I will collapse and pull down the corresponding valve G². The speaking of the corresponding pipe G will thus be effected.

I will now explain how the opening of a valve M³ is effected.

N designates a rod working in guides $n$ and impinging at the upper end against the under side of the valve M³. At the lower end it is supported by a pneumatic motor O. This motor is made in the form of a bellows, and the movable board is provided with an extension upon which the rod N rests. A number of the motors O are arranged on the under side of a wind-chest P. There will be one of these motors O for each note. The wind-chest P communicates through a pipe or duct Q with the equalizer D; hence the air-pressure within the wind-chest P is less than ordinary atmospheric pressure. Each of the motors O has combined with it a duct O'. As shown, the duct O' is formed partly in one upright wall and partly in the top of the wind-chest P. At the end farthest from the motor O it has a vertical extension opening at one end into the atmosphere and at the other end into the wind-chest P. Valves O³ O⁴ are combined with each duct O'. They extend across the vertical extension of the corresponding duct O'. The valves O³ are on the outside of the wind-chest P, but the valves O⁴ are on the inside. Between each pair of valves O³ O⁴ is a pin, which extends through the vertical extension of the corresponding duct O' and is sufficiently long to prevent both valves of a pair being closed at the same time. A spring O⁶ tends to force each valve O' to its seat. A spring O⁷ operates to force each valve O⁴ to its seat when this is possible. The springs O⁶ O⁷ of each pair of valves O³ O⁴ are so organized that normally the valves O⁴ will be closed and the valves O³ will be open; hence the interiors of the motors O will be in communication normally with the atmosphere, and said motors will be expanded.

The valves O⁴ for a number of notes may all be arranged in the wind-chest P. Each valve O⁴ has an extension whereby a pneumatic motor R may operate it. There will be a pneumatic motor R for each note and motors for each valve O⁴. The pneumatic motors R may be made severally in the form of a small bellows. The interior of each communicates with a duct R'. The ducts R' extend, as here shown, along the top of the wind-chest P and upwardly in a tracker or rest R². In the tracker or rest is a duct R' for each note. A music-sheet S is passed over the top of the tracker or rest. It is perforated, and therefore acts as a valve to control the passage of air through the ducts R'. When air from the atmosphere enters any duct R', the corresponding motor R will be expanded. This will cause the opening of the corresponding valve O⁴ and the closing of the opposite valve O³. When this occurs, the corresponding motor O will cease to be in communication with the atmosphere and will be put into communication with the interior of the wind-chest P. As the air in the wind-chest P is attenuated the air under atmospheric pressure within the motor O will rush into the wind-chest P. This will occasion the collapse of the motor. When it is thus collapsed, it will raise the corresponding valve M³ and effect the closing of the opposite valve M⁴. In this manner the speaking of a note will be effected.

It will be observed that there is a combination of exhaust-bellows and force-bellows in an instrument made as described, and that the exhaust-bellows serve to operate under the control of the music-sheet those parts which effect the operation of the valves that control the motors which effect the speaking of the sound-producing devices, but that those motors which effect the speaking of the sound-producing devices are operated by the force-bellows.

The music-sheet may be operated in the ordinary manner, and the power necessary for moving it in either direction may be supplied by the exhaust-bellows. I have represented for this purpose a wind-motor W of a well-known type, consisting of alternately-collapsing chambers controlled by a valve and operating a crank-shaft which is belted to the music-sheet rollers or to shafts geared with said rollers.

What I claim as my invention, and desire to secure by Letters Patent, is—

1. In an automatic musical instrument, the combination of force-bellows for operating the sound-producing devices, pneumatic motors connected to the valves to admit air to the sound-producing devices, and an exhaust-bellows for operating the valves controlling the said pneumatic motors, substantially as specified.

2. In an automatic musical instrument, the combination of a music-sheet, a motor for propelling the same, an exhaust-bellows for operating said motor, a force-bellows for operating the sound-producing devices, valves controlling the speaking of the sound-producing devices actuated by said force-bellows and operating the valves which control the speaking of the sound-producing devices, and other pneumatic motors operated by said exhaust-bellows under control of the music-sheet and serving to effect the operation of the pneumatic motors to cause the speaking of the sound-producing devices, substantially as specified.

3. In an automatic musical instrument, the combination of sound-producing devices, a wind-chest adapted to communicate therewith, valves controlling the communication of said wind-chest with the sound-producing devices, force-bellows communicating with said wind-chest, pneumatic motors arranged in said wind-chest and operating said valves, valves controlling these pneumatic motors, an exhaust wind-chest, exhaust-bellows communicating therewith, pneumatic motors communicating under control of valves with this exhaust wind-chest, connections between the pneumatic motors of the exhaust wind-chest and the valves which control the operation of the pneumatic motors, serving to actuate the valves which cause the speaking of the sound-producing devices, and a music-sheet controlling the pneumatic motors of the exhaust wind-chest, substantially as specified.

4. In an automatic musical instrument, the combination of sound-producing devices, a wind-chest, force-bellows communicating with the wind-chest, valves controlling the communication of the wind-chest with the sound-producing devices, pneumatic motors operating the valves, and valves arranged in pairs, one of each pair being inside and the other of each pair being outside a wind-chest communicating with the force-bellows, and said pairs of valves serving to establish communication between the pneumatic motors and the atmosphere or between the pneumatic motors and the force-bellows, substantially as specified.

5. In an automatic musical instrument, the combination of a wind-chest H, sound-producing devices adapted to communicate therewith, valves $G^2$, controlling the communication of the wind-chest H with the sound-producing devices, pneumatic motors I, for operating said valve, a wind-chest L, communicating with the force-bellows, pairs of valves $M^3 M^4$, arranged upon this wind-chest L, ducts controlled by said pairs of valves and communicating with the said pneumatic motors, an exhaust-wind chest P, pneumatic motors O, arranged upon the wind-chest P, ducts communicating with the motors O and extending to the interior of the wind-chest P and to the atmosphere, pairs of valves $O^3 O^4$, controlling these ducts, pneumatic motors R in the wind-chest P, ducts communicating with the motors R, and a music-sheet controlling the ducts, substantially as specified.

ROBERT W. PAIN.

Witnesses:
C. R. FURGUSON,
WM. H. ROBINSON.